Nov. 3, 1959    W. C. ANDERSON    2,910,869
LIQUID QUANTITY MEASURING SYSTEM AND CAPACITOR FOR USE THEREIN
Filed Sept. 27, 1955    2 Sheets-Sheet 1

INVENTOR.
Wilmer C. Anderson
BY
Attorney

INVENTOR.
Wilmer C. Anderson
BY
Attorney

United States Patent Office 2,910,869
Patented Nov. 3, 1959

2,910,869

LIQUID QUANTITY MEASURING SYSTEM AND CAPACITOR FOR USE THEREIN

Wilmer C. Anderson, Greenwich, Conn., assignor to The Liquidometer Corporation, Long Island City, N.Y., a corporation of Delaware Application September 27, 1955, Serial No. 536,865

12 Claims. (Cl. 73—304)

This invention relates to a liquid quantity-measuring system and a capacitor for use therein, and more specifically, to the measurement of the liquid quantity in a container by dividing the container's entire volume into a predetermined number of given-sized volume units or cells. Then, by determining the number of such cells which are filled or partly filled with liquid, the liquid quantity may be accurately determined irrespective of the position or attitude which the container may have.

In certain applications, particularly in aircraft, the fuel tanks or containers may have irregular and unusual shapes, which render the measurement of the quantity of fuel contained therein relatively difficult. Furthermore, the fact that the aircraft may be maintained from time to time in a wide variety of attitudes creates additional difficulties in the determination of quantity of fuel within such odd-shaped tanks.

By means of this invention the above-mentioned difficulties are entirely overcome and an extremely accurate measurement of the quantity of fuel in a tank may be had, irrespective of the configuration of the tank or the attitude thereof. The accuracy that may be obtained depends to some extent upon the size of the individual elements employed, and therefore may be carried to any desired degree, within practical limits.

An important general object of the present invention is to provide capacitive means of an open-work character which will substantially fill the entire interior volume of the container, the liquid in which is to be measured. This capacitive means should and does provide little or no interference with the free flow of the liquid throughout substantially all parts of the container. The capacitive means itself occupies relatively little volume, in the sense of diminution of the contents of the container for liquid. This capacitive means, considered as a whole, provides two spaced electrodes or electrode systems or means between which the liquid in the container may flow, so as to affect the capacitance of the capacitive means considered as a whole. To the extent that the capacitive means aforesaid is made in a plurality of different portions as hereinafter particularly described, the electrodes of all such portions are connected electrically in parallel, so that the capacitive means, considered as a whole, acts as a single capacitor in the measurement of the amount of liquid in the container. Associated with this capacitive means and suitably electrically connected thereto is a capacitance-responsive circuit of any suitable nature, of which several have been known to the prior art, for the measurement of the amount of liquid in the container in terms of volume, of weight, or alternatively of weight or volume. Electrical circuit systems cooperable with capacitive liquid-sensing means are known for serving all these several purposes, so that details of the electric circuit means as such forms per se no part of the present invention.

It is a more detailed object of this invention to provide a liquid quantity-measuring method for any liquid container which makes use of the expedient of filling the container with a large number of given-sized elements, each of which can determine the presence of the liquid therein. Then, by determining the number of these elements which are filled or partially filled with the liquid and comparing this number with the total number of elements in the container, the quantity of liquid may be determined with reasonable accuracy.

Another object of this invention is to provide a system for measuring the quantity of fuel in a tank by incorporating within the tank a relatively large number of similar capacitor elements. The arrangement is such that the plates or electrodes of these capacitor elements are spaced apart with free access for the liquid to this space. In this way the capacitance which these elements have with the fuel introduced between their electrodes may be measured and compared with the capacitance of these elements when the tank is empty, or full, so as to determine the quantity of fuel in the tank.

Briefly, the invention includes measuring the quantity of a liquid in a tank irrespective of the attitude of said tank. The method of measuring comprises the steps of filling the space in said tank with a plurality of similar volume-measuring elements, determining the number of said elements that are filled or partially filled with liquid, and comparing the number of filled elements with the total number of elements within said tank in order to measure the quantity of liquid contained therein.

The invention also includes a liquid quantity measuring system, wherein such system is for determining the amount of liquid in a container irrespective of the configuration or attitude thereof. Such liquid-measuring system comprises a plurality of similar capacitors collectively filling the interior of said container and having a construction such that a predetermined volume is encompassed by the space between the electrodes of each. The system also comprises means for measuring the capacitance of all of said capacitors simultaneously to determine the number that are immersed, and consequently the amount of liquid in said container.

A preferred embodiment of the invention is described below by way of example, illustrating one manner of carrying out the invention. This embodiment is also illustrated in the drawings, in which.

Figure 1:
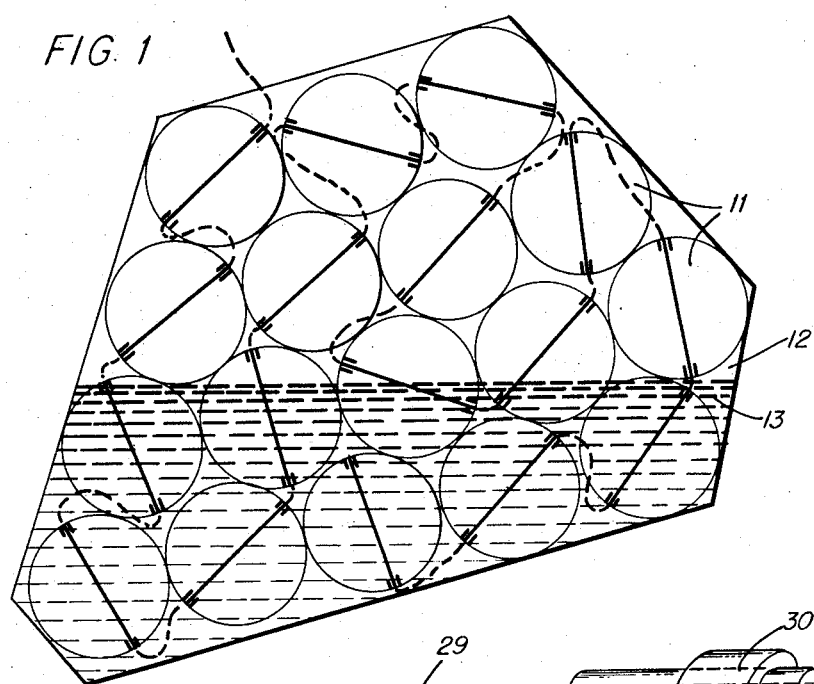
Fig. 1 is a schematic showing of an irregularly shaped container filled with a quantity of spherical capacitor elements.

Referring to Fig. 1 it is pointed out that one manner of carrying out the invention is illustrated. This embodiment is that of employing a plurality of spherical capacitor elements 11 having a given diameter such that they will substantially fill the entire interior of a tank or container 12. It is to be noted that the container 12 has a quantity of liquid 13 therein which may be variable in amount, as for example where the container 12 is an aircraft fuel tank and the liquid 13 is fuel, e.g. gasoline.

It is to be noted that, as indicated by the schematic representation of Fig. 1, the entire volume or space within container 12 is filled with capacitor elements 11 so as to leave a minimum of space outside the volume taken up by the summation of the volumes of all of the spherical elements 11. By employing a given-sized sphere for each of the elements 11, the percentage of the capacity or volume of the tank 12, that is encompassed by the total volume of the space within the spherical elements 11, may be made a substantially predetermined function of the total volume of the tank for providing the required degree of accuracy.

It is pointed out that each of the spherical capacitor elements 11 is perforated over substantially the entire surface thereof so that the liquid may freely flow into and out of the space within each sphere.

Thus, in order to measure the quantity of liquid within the tank 12, it is merely necessary to measure the capacitance of the total number of capacitors 11. Then, by predetermining the capacitance of these capacitors 11 with the tank 12 empty so that the dielectric material for the capacitors 11 is air; and by measuring or otherwise predetermining the capacitance of the entire number of capacitors 11 with liquid introduced between their electrodes, i.e. when the tank 12 is full, a comparison may be made such that the number of capacitors 11 which have their dielectric material changed from air to the liquid may be determined. This determination may readily be calibrated in terms of the liquid volume. Consequently this measurement directly determines the quantity of liquid within the tank 12. A liquid volume measuring circuit of known type is shown in the accompanying drawings. A liquid weight measuring circuit may be provided, for example in accordance with the teachings of the copending application of Sontheimer et al. Serial No. 177,574, filed August 4, 1950. Also, if desired, a circuit system may be provided for measuring the liquid contents of the tank alternatively in terms of weight or volume as taught, for example, in U.S. Patent to Campani, No. 2,738,673, issued March 20, 1956.

Figure 2:
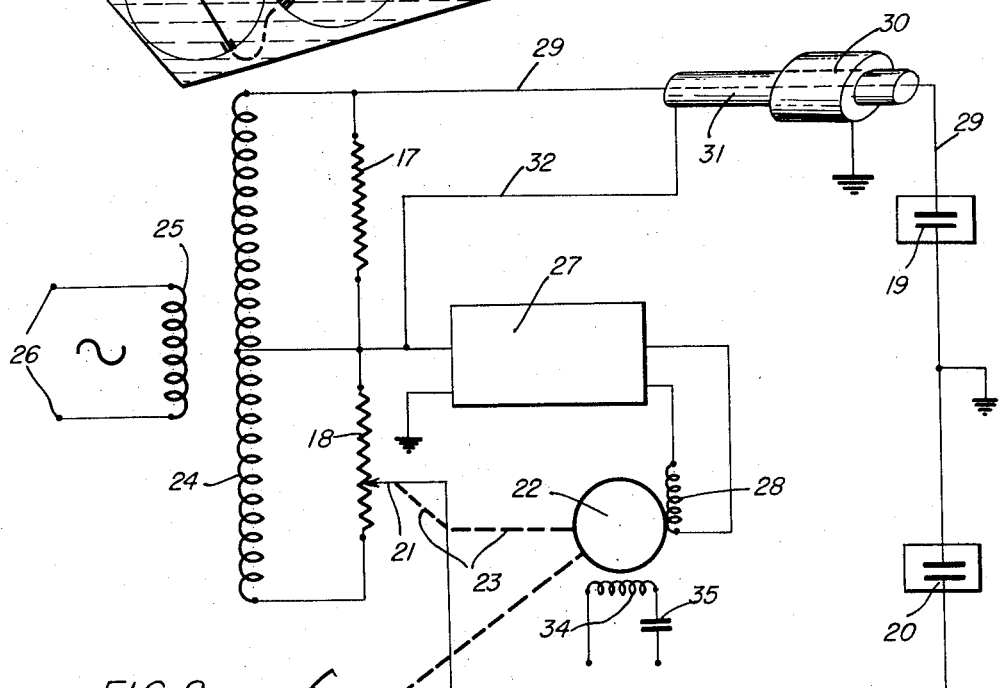
Fig. 2 is an electric circuit diagram illustrating a system for electrically measuring the volume of liquid in the tank according to Fig. 1.

Referring to Fig. 2 it is pointed out that there is illustrated a circuit for one means of carrying out the above-described measurement. The system shown includes a null balance network having two resistors 17 and 18 as two of the elements included therein, while a capacitor 19 (that is made up of the group of spherical capacitors 11) comprises a third element of the null balance network. A fuel capacitor 20 makes up a fourth element of the null balance network. It will be noted that resistor 18 is connected as a potentiometer which has a sliding contactor 21 which is mechanically connected for movement by a motor 22. The mechanical connection is indicated by a dashed line 23. The motor 22 may also drive an indicator 33 for indicating the quantity of liquid in the tank in any desired units, depending upon the calibration.

The null balance network is energized by means of a center-tapped secondary winding 24 that is inductively related to a primary winding 25 that is in turn connected to a pair of terminals 26, to which a suitable source of alternating current (not shown) may be connected. The output of the network is fed to an amplifier 27 which provides an output signal that energizes a control winding 28 of the motor 22. It will be understood that motor 22 may be any feasible type of electric motor, e.g. one having an energizing winding 34 that is connected across the same A.C. source as is connected to the terminals 26, in series with a dephasing capacitor 35 for setting up the required out-of-phase relation in order to obtain the desired torque in the motor. The structure of each capacitor element 11 will be described in greater detail below, but it is pointed out that the interconnection of the group of elements 11 is carried out employing a double-shielded cable, the conductors of which are connected into the circuit as shown in Fig. 2. An inner conductor or wire 29 leads to one of the electrodes of a capacitor 19, and the other electrode of capacitor 19 is connected to ground as is also an outer shield 30 of the cable. An intermediate shield 31 is electrically insulated from both the conductor 29 and the outer shield 30. This intermediate shield 31 is connected to one of the input connections of amplifier 27 by means of a wire 32.

*Operation of Fig. 2*

The system operates by measuring the capacitance of the capacitor 19. This capacitance is in fact composed of the summation of the capacitances of capacitors 11 (Fig. 1) which are connected in parallel. The null balance network will be balanced by reason of the servo arrangement including the motor 22. By properly calibrating the position of potentiometer slider 21 along the length of resistor 18, a direct indication of the number of capacitor elements 11 that are immersed (or the volume of the liquid contained in the tank 12) may be had. The indication of the quantity of liquid may be had by means of the indicator 33 which is mechanically driven by the motor 22 simultaneously with the slider 21 of the potentiometer.

It will be clear that with all of the capacitor elements 11 either immersed in the liquid filled with air, the balance point of the null-balance network will be at one or the other extreme of the slider 21 along the length of resistor 18. Then, as the quantity of liquid changes and various numbers of the capacitor elements 11 are changed from total immersion to an empty condition or vice-versa. the balance network will be unbalanced by such change so that a signal will be introduced to the amplifier 27 and fed to the motor 22 via its control winding 28 to cause the slider 21 to be moved in a direction to restore the balance of the bridge network and reduce the signal input to amplifier 27 to zero. At the same time the indicator 33 will be driven to the indication representing the quantity of liquid at balance condition.

Figure 3:
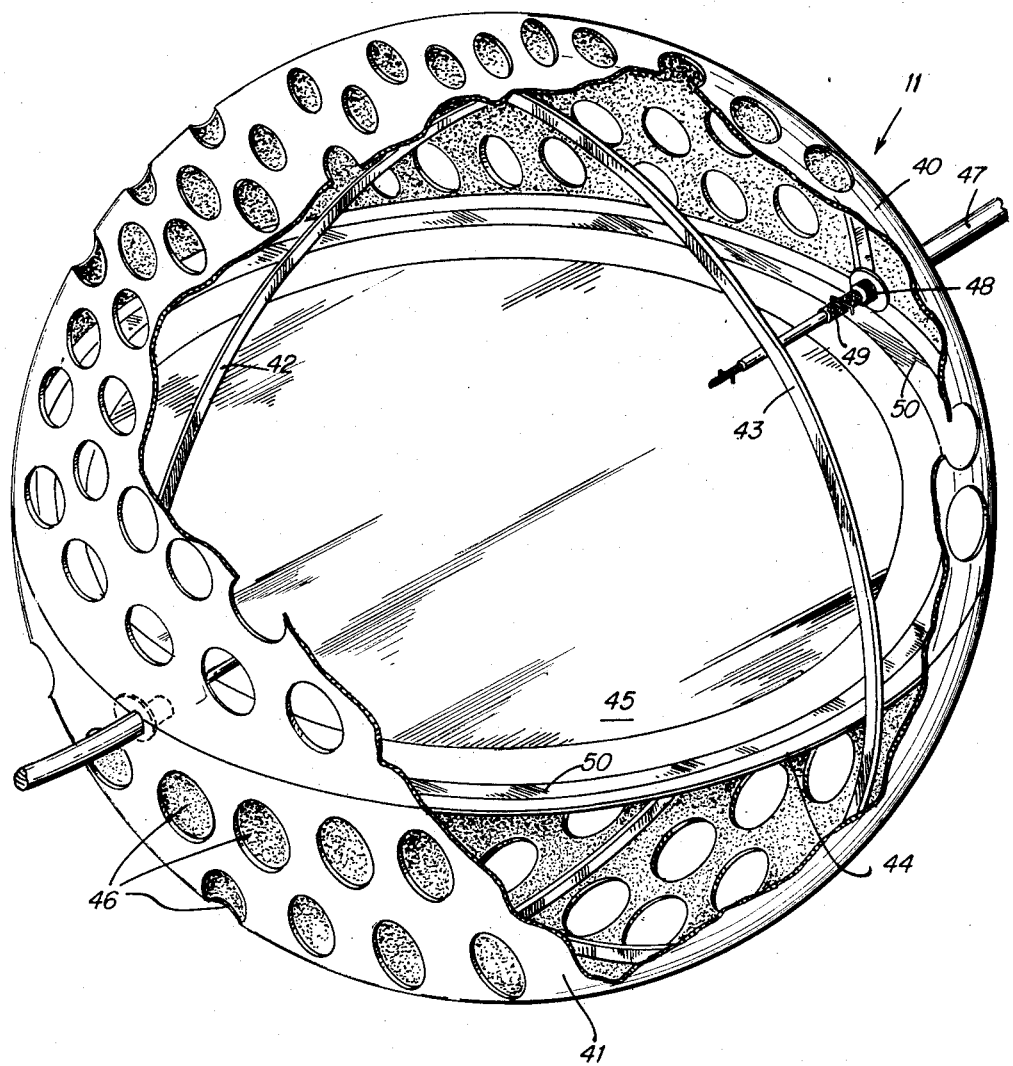
Fig. 3 is an enlarged perspective view, partly broken away to show the interior of a single spherical capacitor element which may be employed in the system of Figs. 1 and 2.

While numerous different constructions might be employed for the capacitor elements 11 to be used in a system according to this invention, one form of a spherical capacitor is illustrated in Fig. 3. It is to be noted that the capacitors employed in a system according to this invention need not necessarily be spherical but might take various other configurations for accomplishing the desired results. However, a spherical shape adapts itself to filling odd-shaped containers to the maximum extent and therefore it is preferred that a spherical construction be employed.

In Fig. 3 it will be observed that the structure illustrated will be identical for each capacitor element 11. There is a sphere comprising two hemispherical thin-walled portions 40 and 41. These hemispherical elements may be constructed of a solid conducting material, e.g. aluminum, or if desired, may be made up of plastic material with a conducting material coating on the interior surface thereof, e.g. silver. Where such a silvered plastic material is employed, it is contemplated that a pair of ribs 42 and 43 may be employed for strengthening the construction to avoid crushing of the spherical surfaces. These ribs 42 and 43 will be placed preferably at right angles to one another, within and in supporting contact against the surface of the hemispherical portions 40 and 41. Dividing the sphere into two halves there is a plastic or other insulating material disc 44 which has at the center thereof a circular area 45 which is coated with a conductive material such as silver for providing one of the electrodes of the capacitor element. The arrangement is symmetrical so that the underside of disc 44 is also coated over the entire central area thereof with a conductive coating such as silver, in like manner to the area 45 shown. The entire surfaces of both hemispherical portions 40 and 41 are perforated with staggered holes 46 in order to allow the free passage of the liquid into and out of the entire inside volumetric space of the capacitor unit 11.

The electrical connection from each capacitor unit 11 is effectuated by means of the illustrated arrangement employing a double shielded cable 47 having an outer conducting shield 48, that is electrically connected to the inside conducting surface of the hemispherical elements 40 and 41. This may be carried out in any feasible manner such as by means of soldering or the like (not shown). The cable 47 has an intermediate shield 49 which is employed to maintain electrical separation or shielding from one capacitor unit 11 to the next, and for purposes of balancing out the capacitance of the cable itself, as explained above. The electrical circuit involving this intermediate shield 49 is continued from one capacitor unit 11 to the next by means of a conducting material ring 50 that is spaced radially in from the edge of the dividing disc 44. This ring 50 is thus insulated from the inner surface electrode made up of the coated hemispherical elements 40 and 41. This conducting ring 50 is also spaced from the other electrode, formed by coated area 45, so as to maintain its conductive path as a separate electrical circuit. This intermediate shield 49 circuit is then continued from one capacitor unit 11 to the next without making any connection electrically with either of the electrode circuits.

While a particular embodiment of the invention has been described in considerable detail in accordance with the applicable statutes, this is not to be taken as in any way limiting the invention, but merely as being descriptive thereof.

It is claimed:

1. Apparatus for measuring the amount of liquid in a container irrespective of the attitude thereof, comprising open-work capacitive means substantially filling the interior of said container but presenting relatively little interference to flow of liquid therein at any and all parts of said container, said capacitive means including first electrode means and second electrode means, each of said electrode means extending three dimensionally substantially throughout the entire volume of said container to provide a substantially constant increment of capacitance between said first and second electrode means per unit of the volume of said container; all portions of said first electrode means being electrically connected together, and all portions of the second electrode means being separately electrically connected together, so that said capacitive means as a whole may be electrically connectable as a single capacitor in said container; and electric circuit means responsive to the capacitance of said capacitive means and constructed and arranged to indicate the amount of liquid in said container as a function of said capacitance.

2. A liquid quantity-measuring system for determining the amount of liquid in a given-sized container irrespective of the configuration or attitude thereof comprising a plurality of capacitors collectively extending in three dimensions so as substantially completely to fill the entire interior of said container and having a construction such that a predetermined volume is encompassed by the space between the electrodes of each of said capacitors, so that there will be a substantially constant increment of capacity per unit of volume of said container when the capacitance of all said capacitors is considered collectively, each of said capacitors including means for permitting said liquid to flow freely into and out of the space between the electrodes thereof to allow the liquid to be the dielectric therefor, and means for measuring the capacitance of all of said capacitors simultaneously to determine the amount of liquid in the container as a function of said capacitance.

3. A liquid quantity-measuring system in accordance with claim 2, further comprising connector means interconnecting all said capacitors mechanically as a string of beads and electrically with the electrodes of each of said capacitors respectively electrically connected in parallel.

4. A liquid quantity-measuring system in accordance with claim 2, in which each of said capacitors includes a first electrode and a second electrode, means electrically connecting the first electrodes of all said capacitors together to form a first electrode means, and other means electrically connecting the second electrodes of all said capacitors together to form a second electrode means and in which said capacitance measuring means is connected to be responsive to the capacitance between said first and said second electrode means.

5. A liquid quantity-measuring system for determining the amount of liquid in a given-sized container irrespective of the configuration or attitude thereof comprising a plurality of capacitors collectively extending in three dimensions so as substantially completely to fill the entire interior of said container so as to divide the entire volume thereof into predetermined-sized increments, each of said capacitors having a symmetrical geometric shape, each of said capacitors including means for permitting said liquid to flow freely into and out of the space between the electrodes thereof to allow the liquid to be the dielectric therefor, so that there will be a substantially constant increment of capacity per unit of volume of said container when the capacitance of all said capacitors is considered collectively, and means for measuring the capacitance of all of said capacitors simultaneously to determine the amount of liquids in the container as a function of said capacitance.

6. A liquid quantity-measuring means for determining the amount of liquid in a container irrespective of the attitude thereof, comprising a plurality of similar capacitors collectively substantially filling the interior of said container, so as to divide the volume thereof into predetermined sized increments; each of said capacitors being substantially spherical in shape and comprising a perforated thin outer shell having a hollow interior, at least the inside surface portion of said shell being formed of conductive material to form one electrode of said capacitor, a second electrode for said capacitor provided by oppositely facing conductive surface portions of a central member, which conductive portions are separated from the adjacent portions of said shell by at least an annular band of insulating material; means connecting said electrodes of all said similar capacitors respectively in parallel; and electric circuit means connected to said plurality of parallel-connected capacitors, responsive to the capacitance thereof, and constructed and arranged to indicate the amount of liquid in said container as a function of said capacitance.

7. A liquid quantity-measuring system for determining the amount of liquid in a container irrespective of the attitude thereof, comprising a plurality of similar capacitors collectively substantially filling the interior of said container, so as to divide the volume thereof into predetermined-sized increments; each of said capacitors being substantially spherical in configuration and comprising a perforated thin outer shell surrounding a hollow interior, at least the inside surface portion of said shell being formed of conductive material to form one electrode of each said capacitor, a centrally located disc of insulating material dividing said shell into two substantially equal parts, said disc having conductive material surface portions formed thereon and connected together but insulated from the conductive material surface of said shell at least by annular portions of the insulating material of said disc, so as to form the other electrode of the capacitor; means connecting said electrodes of all said similar capacitors respectively in parallel; electric circuit means connected to said plurality of parallel-connected capacitors, responsive to the capacitance thereof, and constructed and arranged to indicate the amount of liquid in said container as a function of said capacitance.

8. A liquid quantity-measuring system for determining the amount of liquid in a container irrespective of the attitude thereof, comprising a plurality of similar capacitors, which collectively extend in three dimensions so as substantially to fill the entire interior of said container, and in which each of said capacitors has a construction such that a predetermined volume is encompassed by the space between the electrodes thereof; means connecting all said capacitors in parallel, so that there will be a substantially constant increment of capacity per unit of volume of said container when the capacitance of all said capacitors is considered collectively; and electric circuit means connected to said plurality of parallel-connected capacitors, responsive to the capacitance thereof, and constructed and arranged to indicate the amount of liquid in said container as a function of said capacitance.

9. A liquid quantity-measuring system for determining the amount of liquid in a container irrespective of the attitude thereof, comprising a plurality of capacitors collectively extending in three dimensions so as substantially to fill the entire interior space within said container; said capacitors being identical in shape and physical characteristics and each having an open space between the electrodes thereof so constructed and arranged that the liquid in said container can freely flow therein to become the dielectric material for said capacitors to an extent depending upon the level of the liquid in the container; means connecting said plurality of capacitors together electrically in parallel, so that there will be a substantially constant increment of capacity per unit of volume of said container when the capacitance of all said capacitors is considered collectively; and electric circuit means connected to said plurality of parallel-connected capacitors, responsive to the capacitance thereof, and constructed and arranged to indicate the amount of liquid in said container as a function of said capacitance.

10. A liquid quantity-measuring system for determining the amount of liquid in a container irrespective of the attitude thereof, comprising a plurality of similar capacitors collectively substantially filling the interior of said container, so as to divide the volume thereof into predetermined-sized increments; each of said capacitors being substantially spherical in configuration and comprising a perforated thin outer shell surrounding a hollow interior, at least the inside surface portion of said shell being formed of conductive material to form one electrode of said capacitor, a centrally located disc of insulating material dividing said shell into two substantially equal parts, said disc having surface portions of conductive material formed thereon and electrically connected together but insulated from the conductive material surface portion of said shell, so as to form the other electrode of each capacitor; a double shield conductor cable having portions connecting said plurality of capacitors to one another and electrically in parallel, said cable having an inner conductor insulated from and surrounded by an electrically conductive intermediate shield, which is in turn insulated from and surrounded by an electrically conductive outer shield; means connecting the electrodes formed by the inner surface portions of the outer shells of all said capacitor to said outer shield, means connecting said inner conductor to the second-named electrodes formed by conductive surface portions of the central discs of all said capacitors, means connecting said intermediate shield of all portions of said cable from each one of all said plurality of capacitors to the next; a null balance network including a fixed value capacitor in one circuit branch, circuit means including said double shield conductor cable for connecting said plurality of substantially spherical capacitors into another circuit branch said null balance network to oppose the capacitance of said fixed value capacitor, means connecting all said intermediate shield portions to a neutral point in respect to the opposing circuit branches of said null balance network, and variable means for balancing said network, so as to indicate the amount of liquid in said container when the network is in balance.

11. A substantially spherical capacitor, comprising a hollow, substantially spherical shell having a conductive material surface portion constituting a first electrode, a disc dividing said spherical shell into substantially equal halves, said disc having a conductive material portion on each side of its central area, which portions are insulated from the conductive material surface portions of said shell and constitute a second electrode, and conductive means respectively connected to said electrodes for making electrical contact therewith.

12. A substantially spherical capacitor, comprising a hollow substantially spherical shell having a conductive material inner surface portion constituting a first electrode, said shell being perforated to allow passage of a liquid dielectric for replacing the gas contained in the hollow interior, a disc dividing said spherical shell into substantially equal halves, said disc having conductive material portions on both sides of its central area constituting a second electrode and which portions are insulated from said first electrode, and conductive means connected to each of said electrodes for making electrical contact therewith.

References Cited in the file of this patent

UNITED STATES PATENTS

| | | |
|---|---|---|
| 2,541,743 | Brockman et al. | Feb. 13, 1951 |
| 2,563,281 | Griffith | Aug. 7, 1951 |
| 2,581,085 | Edelman | Jan. 1, 1952 |
| 2,633,028 | Fillebrown | Mar. 31, 1953 |
| 2,699,523 | Meyers | Jan. 11, 1955 |
| 2,721,976 | Wojciechowski | Oct. 25, 1955 |
| 2,751,531 | Barrett | June 19, 1956 |

UNITED STATES PATENT OFFICE
CERTIFICATE OF CORRECTION

Patent No. 2,910,869

November 3, 1959

Wilmer C. Anderson

It is hereby certified that error appears in the printed specification of the above numbered patent requiring correction and that the said Letters Patent should read as corrected below.

Column 4, line 15, for "liquid filled" read -- liquid or filled --; line 16, for "point of" read -- point for --.

Signed and sealed this 3rd day of May 1960.

(SEAL)
Attest:

KARL H. AXLINE
Attesting Officer

ROBERT C. WATSON
Commissioner of Patents